US012357094B2

(12) United States Patent
DuFresne (10) Patent No.: US 12,357,094 B2
(45) Date of Patent: Jul. 15, 2025

(54) GAS LIFT CYLINDER REMOVAL DEVICE

(71) Applicant: Anthro Form, LLC, Waukesha, WI (US)

(72) Inventor: Steven DuFresne, Hartland, WI (US)

(73) Assignee: Anthro Form, LLC, Waukesha, WI (US)

( * ) Notice: Subject to any disclaimer, the term of this patent is extended or adjusted under 35 U.S.C. 154(b) by 0 days.

(21) Appl. No.: 18/464,183

(22) Filed: Sep. 8, 2023

(65) Prior Publication Data

US 2024/0081533 A1    Mar. 14, 2024

Related U.S. Application Data

(60) Provisional application No. 63/404,844, filed on Sep. 8, 2022.

(51) Int. Cl.
| | | |
|---|---|---|
| *A47C 3/24* | (2006.01) | |
| *A47C 1/032* | (2006.01) | |
| *A47C 3/30* | (2006.01) | |
| *A47C 4/02* | (2006.01) | |

(52) U.S. Cl.
CPC ............ *A47C 3/24* (2013.01); *A47C 1/03283* (2013.01); *A47C 3/30* (2013.01); *A47C 4/02* (2013.01)

(58) Field of Classification Search
CPC ......... A47C 1/03283; A47C 3/24; A47C 3/30; A47C 4/02
USPC ........................................ 297/344.19, 344.16
See application file for complete search history.

(56) References Cited

U.S. PATENT DOCUMENTS

| | | | | |
|---|---|---|---|---|
| 1,730,252 | A  * | 10/1929 | Temple ................... | A47C 9/08 108/147 |
| 10,260,671 | B2 * | 4/2019 | James ..................... | F16M 11/42 |
| 2021/0345778 | A1 * | 11/2021 | Ho ........................... | A47C 3/24 |

* cited by examiner

Primary Examiner — Milton Nelson, Jr.
(74) Attorney, Agent, or Firm — Boardman & Clark LLP (57) ABSTRACT

An example gas lift cylinder removal device described herein includes a collar assembly having a guide pin, a set screw, and a lead screw. The example cylinder removal device is disposed on a gas lift cylinder and provided proximate to and below a seat plate assembly of an example task chair. Operation of the gas lift cylinder removal tool from a first position to a second position provides a mechanical advantage to impart an upward force on a bushing of the seat plate assembly, thereby displacing the cylinder from the seat plate assembly. An example task chair having the gas lift cylinder removal tool is described herein comprising a support surface, a seat plate assembly, and a base assembly, the seat plate assembly including a bushing, an upper plate and a lower plate.

15 Claims, 10 Drawing Sheets

GAS LIFT CYLINDER REMOVAL DEVICE

CROSS-REFERENCE TO RELATED APPLICATIONS

This application claims the benefit of U.S. Provisional Patent Application No. 63/404,844 filed Sep. 8, 2022, entitled "GAS LIFT CYLINDER REMOVAL DEVICE" the entire content of which is hereby incorporated by reference herein in its entirety.

BACKGROUND

This disclosure relates to an apparatus for disassembling a gas lift cylinder from a seat support surface. This disclosure further relates to a chair, such as an office chair or a task chair, having a gas lift cylinder removal device.

Height-adjustable seats, such as office chairs, task chairs, gaming chairs and the like typically operate or adjust height using a gas lift cylinder (pneumatic piston cylinder). Gas lift cylinders are typically press fit into seat plates. One example press fit is a morse taper press fit. The gas lift cylinders can be press fit as part of a manufacturing process using a tremendous amount of force. Over time, wear and tear can cause cylinder failure leaving a user unable to adjust the height of a seating surface. Replacing a failed lift cylinder can be a laborious task. Breaking the friction fit between the failed cylinder and the seat plate may be nearly impossible to do without destroying, or at least damaging, the rest of the chair. There is a need for a task chair having a gas lift cylinder removal device.

SUMMARY

A gas lift cylinder removal device for a task chair is described herein. The device allows a user to safely, and easily, disassemble an existing gas lift cylinder from a task chair.

In one embodiment, the gas lift cylinder removal device comprises a collar assembly having a guide pin, a set screw, and a lead screw. The collar assembly is disposed below a seat plate or a housing structure of the support surface such that the mechanical action provided by the cylinder removal device can be translated to a surface of the seat plate or housing structure of the support surface, thus separating the gas cylinder from the task chair. In one construction, the gas lift cylinder removal device comprises a collar assembly mounted to a gas lift cylinder. The assembly has a first guide pin, a second guide pin opposite the first guide pin, a set screw, a first lead screw, and a second lead screw. The collar assembly is mounted to a gas lift cylinder below a seat plate of a task chair using the set screw. The first and second guide pins can project from the assembly to within the seat plate preventing rotation of the removal device. Movement of the first and second lead screws from a first position to a second position imparts a mechanical displacement between the collar assembly and a seat plate of a task chair, thereby breaking the press-fit engagement otherwise securing the gas cylinder.

An example task chair is described herein that includes the gas lift cylinder removal device. The task chair comprises a support surface, a seat plate assembly, a base assembly having a gas lift cylinder, and a gas lift cylinder removal device. The removal device is provided on the cylinder in a region below the seat plate assembly and the seat plate assembly is coupled to the gas lift cylinder. The seat plate assembly of the example task chair includes a bushing, an upper plate, and a lower plate. The bushing having an edge to receive mechanical contact imparted from the removal device.

As mentioned above, the gas lift cylinder removal device can be used in a variety of different applications in addition to the described chair. Such applications may include, but are not limited to, office chairs, gaming chairs, pneumatic stools and seats (including clinic stools, garage stools, or bar stools, barber seats or any other pneumatic seats), and other suitable height-adjustable furniture which employs gas lift cylinders.

These and other features, advantages, and embodiments of apparatus and methods according to this invention are described in, or are apparent from, the following detailed descriptions of various examples of embodiments.

BRIEF DESCRIPTION OF THE DRAWINGS

Various examples of embodiments of the systems, devices, and methods according to this invention will be described in detail, with reference to the following figures.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

Within the scope of this application, it is expressly intended that the various aspects, embodiments, examples, and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

DETAILED DESCRIPTION OF THE DRAWINGS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring to the Figures, a gas lift cylinder removal device for a task chair is disclosed herein. While specific examples are described and illustrated, the gas cylinder removal device can be used with any suitable pneumatic-adjustable piece of furniture.

Figure 1:
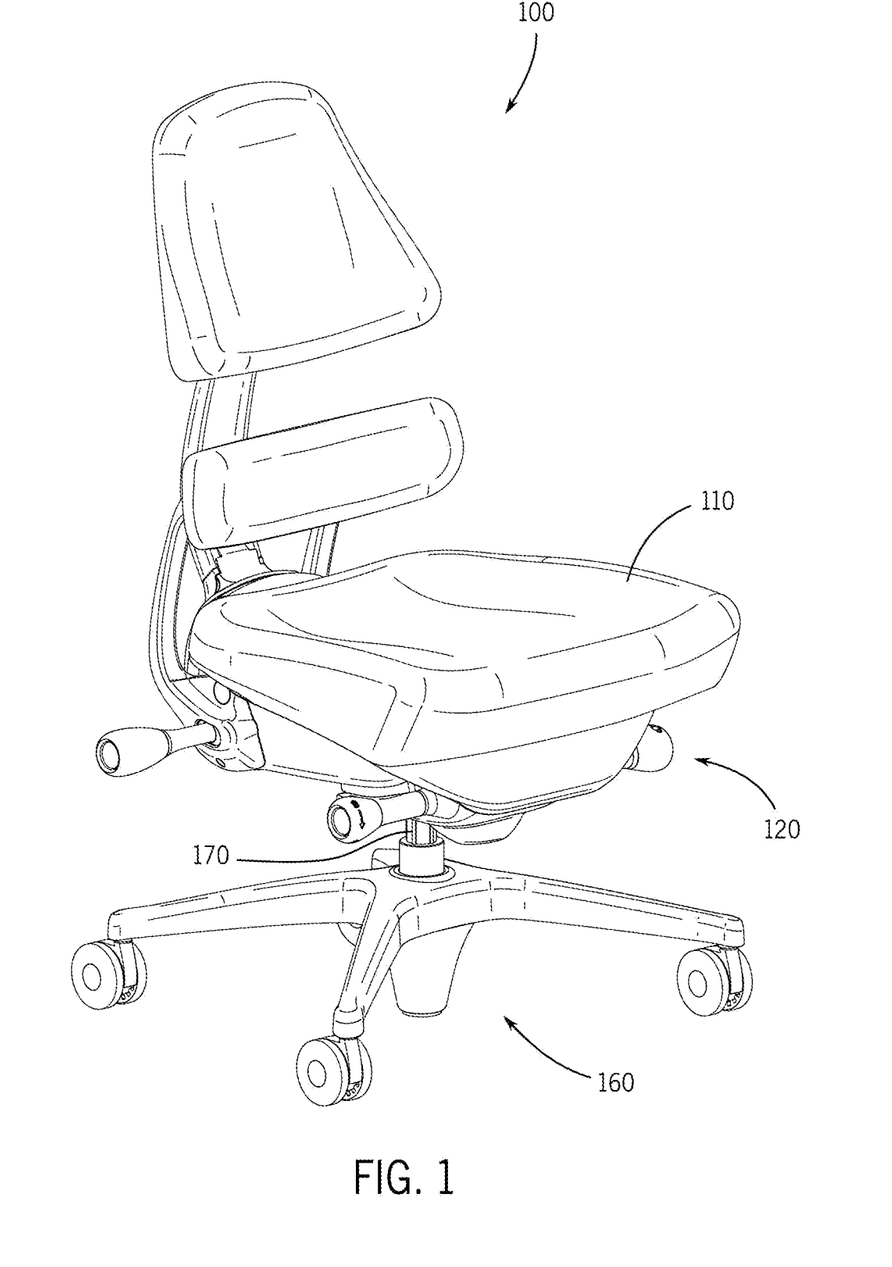
FIG. 1 depicts a perspective view of an example task chair incorporating one or more aspects of the invention.
Figure 2:
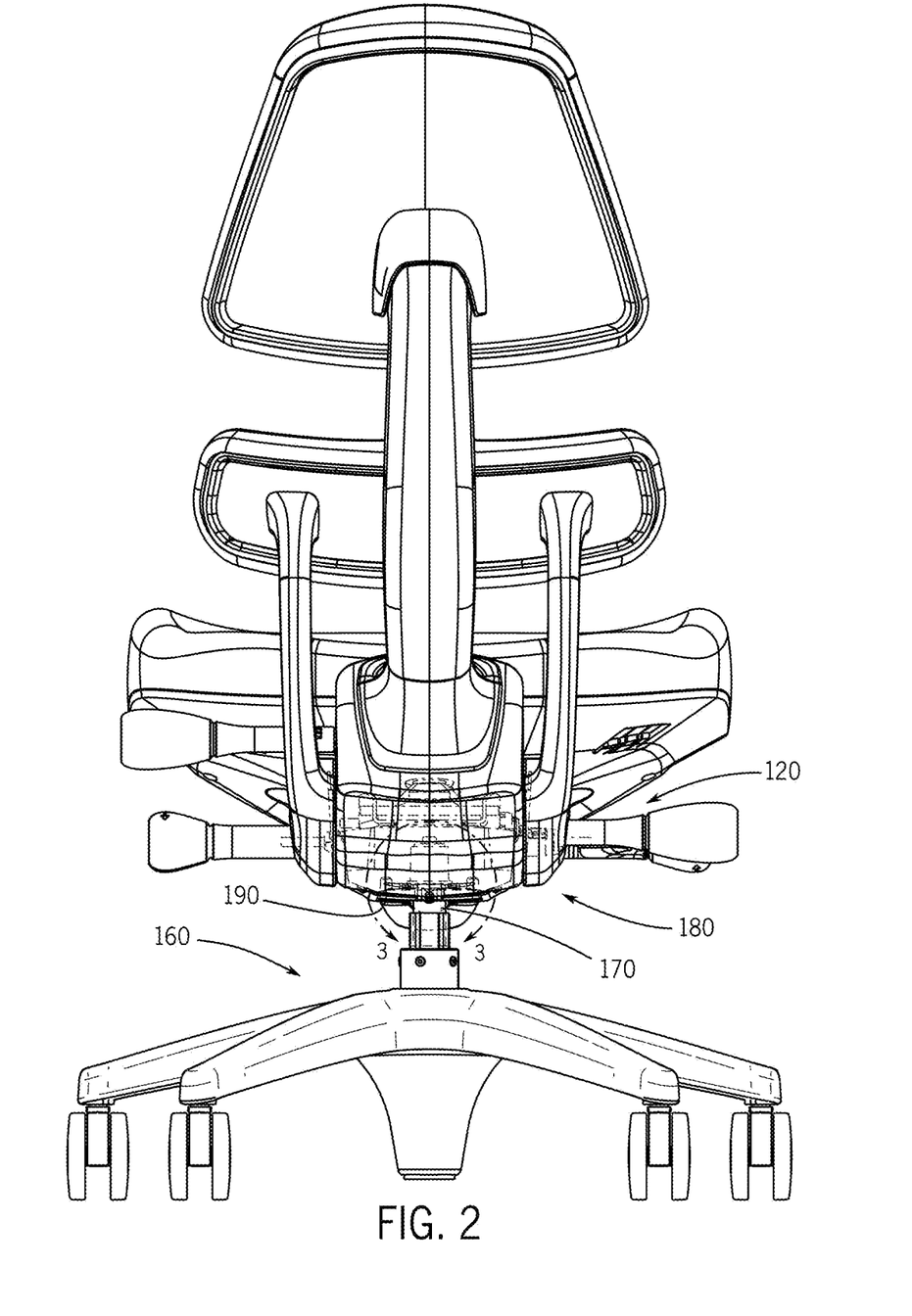
FIG. 2 depicts a rear perspective view of a gas lift cylinder removal device for use with the task chair of FIG. 1.

FIG. 1 is a perspective view of an example height-adjustable seat, and in particular, a task chair 100. The example task chair includes a support surface 110, a seat plate assembly 120, and a base assembly 160. The base assembly having a gas lift cylinder 170. Gas lift cylinders (which may also be referred to as pneumatic piston cylinders) are typically employed to adjust (e.g., raise or lower) the height of height-adjustable seating. As a part of some manufacturing and assembly process, pneumatic cylinders are pressed into a seat plate or housing structure disposed below a seating surface using a substantial amount of force. A tapered shape of the cylinder and a matching receiving surface of the seat plate aids in coupling the cylinder to the seat plate, the resulting friction fit creates a strong and difficult bond to break. However, the bond can be broken using mechanical advantage provided by a gas lift cylinder removal device shown and described herein.

FIGS. 2-5 depict an example embodiment of a gas lift cylinder removal device 180 for use with the chair 100 illustrated in FIG. 1. In the illustrated example shown in FIG. 2, the pneumatic cylinder removal device 180 is disposed in a region below the seat plate assembly 120 (shown in broken lines). The example seat plate assembly includes a bushing or sleeve 125, an upper plate 130, and a lower plate 140, the bushing having an inner, tapered surface to receive the gas lift cylinder. In other applications, the cylinder removal device 180 may be disposed beneath any surface, housing, or structure which couples a gas lift cylinder to a piece of furniture, such as for example, a conventional seat plate mechanism, a mechanical housing/structure, or a seat swivel base mount plate. Best seen in FIGS. 3 and 4, the bushing 125 further includes a projecting lower edge or lip 126 that flares outward. When assembled, the projecting edge 126 is nestled between an upper plate 130 and a lower plate 140 of the seat plate assembly 120, thus coupling the gas lift cylinder 170 to the example task chair 100.

Figure 3:
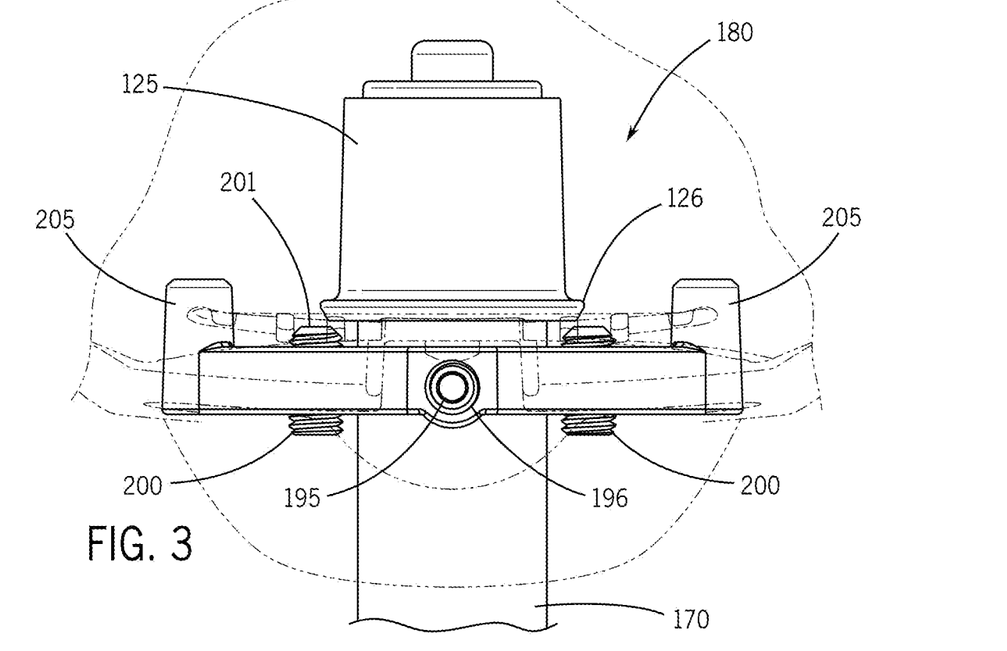
FIG. 3 is detailed view of the gas lift cylinder removal device of FIG. 2 shown isolated from the task chair of FIG. 1.
Figure 4:
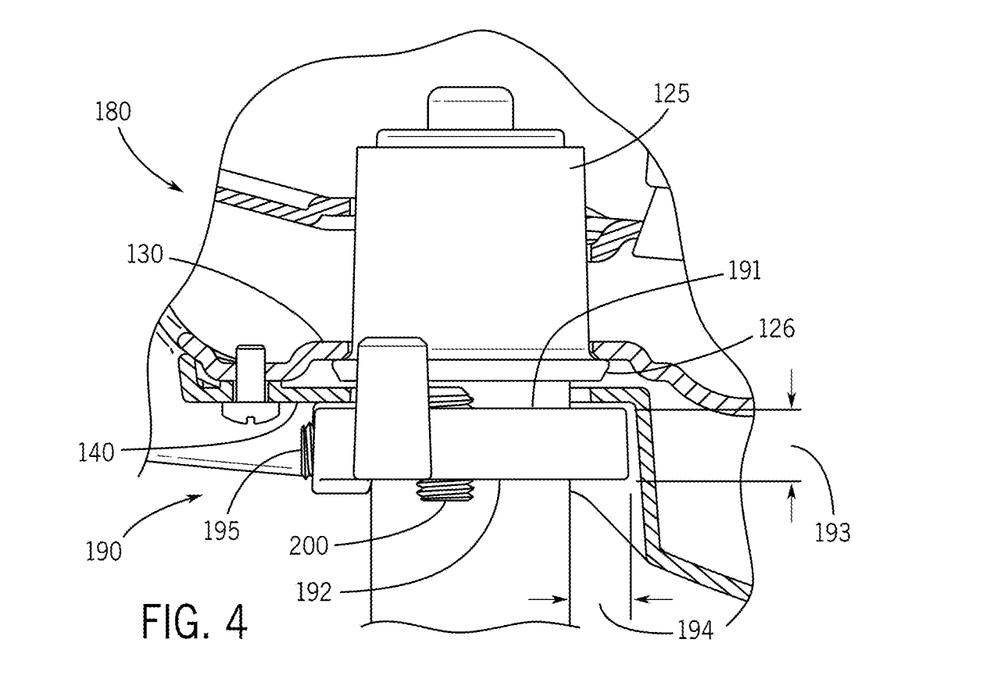
FIG. 4 depicts a side view of the gas lift cylinder removal device shown in perspective with the seat plate assembly for use with the task chair of FIG. 1.
Figure 5:
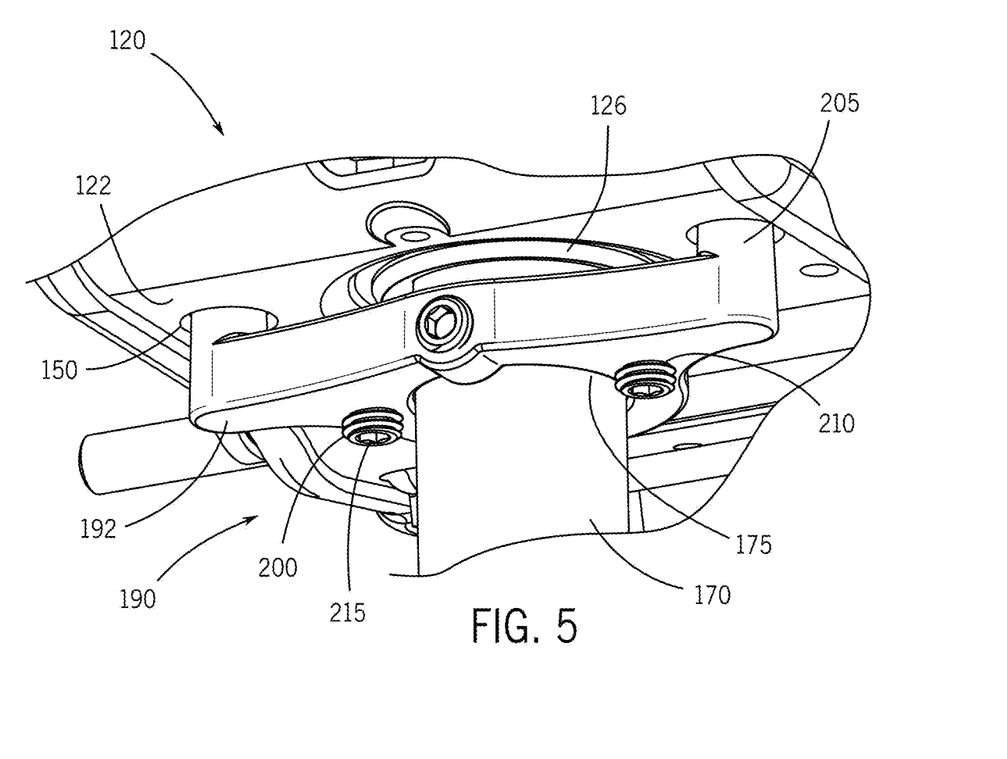
FIG. 5 is a rear elevation view of a gas lift cylinder removal device for use with the task chair of FIG. 1.

Referring now to FIG. 3, an example gas lift cylinder removal device 180 is shown isolated from the surrounding seat plate assembly 120. The pneumatic piston 170 extends from the base assembly 160 (not shown) into the seat plate assembly 120. An inner surface of the bushing 125 is tapered to receive the gas lift cylinder 170 and a lower edge 126 of the bushing includes a flaring projection surrounding the circumference, the edge 126 further having a curved portion. The example gas cylinder removal device 180 is disposed in a region below the seat plate assembly 120. In the example construction shown, the gas cylinder removal device 180 comprises a collar assembly 190 having a first and second guide pin 205 opposite the first guide pin, a set screw 195, and a first and second lead screw 200. A first or central region of the collar assembly 190 is substantially cylindrical comprising an annular, ring-like shape in the form of a sleeve structure. The sleeve structure includes a thickness 193 and a width 194 across a diameter of the sleeve in an area surrounding a first aperture 175 provided to receive (engage or surround) the gas lift cylinder 170. The central region of the collar assembly further includes a set screw 195 provided in aperture 196 extending through width 194 to lock the removal tool 180 in place on the cylinder 170. As shown in FIG. 5, the central region includes two additional apertures 210 adjacent the first aperture 175 extending through the assembly 190 from a lower (bottom) surface 192 to a top surface 191 and provided in a region directly below the lower edge 126 of the bushing, each of the two additional apertures configured to receive a lead screw 200. Lead screw 200 functions to provide a simple mechanical advantage and may alternatively be referred to as a power screw, jack screw, or translation screw. Specifically, actuation of the removal device 180 is achieved by converting rotary (rotational) motion of the lead screw 200 into linear movement.

As mentioned above, a great deal of force is required to break the press-fit coupling the gas lift cylinder 170 to the example task chair 100. Accordingly, the cylinder removal tool 180 described herein is configured to bear a substantial load while employing a simple mechanical advantage. Particularly, set screw 195 is provided to fixedly couple (e.g., to prevent rotation or translation of) the removal tool 180 to the gas lift cylinder 170. This is necessary to provide an anchoring or bearing point/surface along the cylinder 170 from which lead screws 200 can displace the cylinder from the seat plate assembly 120. In the example construction, the collar assembly 190 is configured to withstand and resist most any combination of forces while being operated by a user. It should be appreciated that the thickness 193 and width 194 of the collar assembly 190 are appropriately reinforced and dimensioned to provide structural integrity to the collar assembly of the cylinder removal device 180. While the collar 190 is illustrated and described as having a defined number of features, the collar may, in other applications, comprise any number of the aforementioned features or any combination thereof. For example, a gas lift cylinder removal tool 180 may have more than one set screw or only one lead screw; the removal tool may have three or four lead screws.

In the illustrated construction, an outer region of the collar assembly includes two projections extending opposite one another. Each projection includes a guide pin 205 disposed on an upper surface 191 of the collar assembly and extending therefrom. The first and second guide pins 205 extend within the seat plate assembly 120. The guide pins prevent rotation of the gas lift cylinder removal device 180 relative to the seat plate assembly. One implementation of the collar assembly 190 is described herein as having reinforced guide pins. However, in some applications the collar assembly of the cylinder removal device 180 may not include such a feature. For example, it should be appreciated that a gas cylinder removal device 180 may comprise a collar assembly 190 having a substantially cylindrical construction. In such an example construction, the assembly 190 can be annular or ring-shaped such that the collar assembly forms a unitary sleeve structure having a thickness 193 and width 194. The collar assembly further includes a set screw 195 disposed in aperture 196 and two lead screws 200 provided in apertures 210 disposed extending through the sleeve structure and adjacent to the central aperture 175. The thickness 193 and width 194 of the present construction being sized and shaped to promote structural integrity of the collar 190.

In FIG. 5, the example gas lift cylinder removal device 180 is shown assembled on a cylinder 170 and positioned below the seat plate assembly 120. In the illustrated embodiment, the collar assembly 190 is asymmetrical, the projections including the first and second guide pins 205 being biased towards a rear of the example task chair 100. In another implementation, the collar assembly 190 may be symmetrical about an axis of the gas lift cylinder 170. In the example construction shown, the lead screw 200 is provided in a first position 215 in aperture 210 proximate to and below the lower edge 126 of the bushing. The lower edge of the bushing is disposed between the upper plate 130 and the lower plate 140 of the seat plate assembly 120. In the example illustrated in FIG. 5, first and second guide pins 205 may be seen extending into apertures 150 provided on a surface 122 of the seat plate assembly, thereby preventing rotation of the collar assembly 190 with respect to the seat plate assembly. First and second lead screws 200 may be seen illustrated in a first position 215. More specifically, each of the first and second lead screws can be partially primed or threaded within aperture 210. While in a first position 215, a first portion of the first and second lead screws 200 may extend from a bottom surface 192 of the cylinder removal device and a second portion may extend projecting from a top surface 191 of the removal device 180. Thus, lead screws 200 may vary in length. In the example construction shown, lead screws 200 are hex screws; however, it should be appreciated that any suitable power screw or bolt can be used for the purposes of this disclosure. For example, in some applications lead screws 200 may be configured for hand-rotation (i.e., without the use of a tool such as a wrench, key, hex key, screw driver, etc.). In other implementations, lead screws 200 can be configured for power automation, for example using an electric motor. While a lead screw is disclosed, actuation of the cylinder removal device 180 can be achieved through other means including fluid power (i.e., hydraulics and pneumatics), leverage power (i.e. lever and fulcrum), gear trains (e.g., worm drives, rack-and-pinion drive), and electromagnetic actuation.

Figure 6:
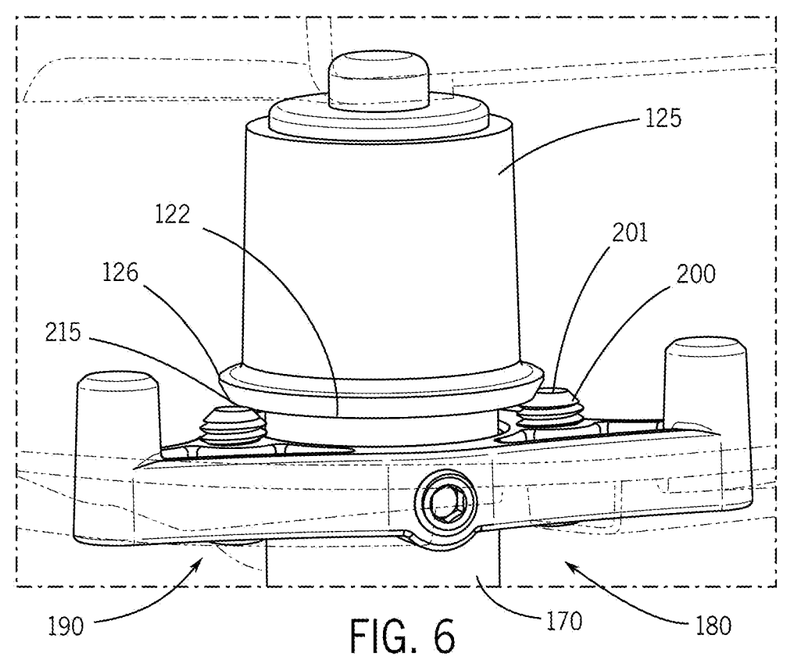
FIG. 6 is an isolated perspective view of the gas lift cylinder removal device of FIG. 5 shown prior to operation of the device.

The example gas lift cylinder removal device 180 described herein can function to provide a mechanical advantage to safely and easily break (i.e., separate, disassemble, uncouple) the friction-fit coupling the gas cylinder 170 to the seat plate assembly 120, and particularly according to one embodiment, the bushing 125. FIGS. 6-9 illustrate the transition from a first, assembled position 215 to a second, disassembled position 220 following the operation of the gas cylinder removal device 180. Referring first to FIG. 6, the example gas cylinder 170 is depicted in an assembled state. In the example embodiment, lead screws 200 are provided in a first position 215 such that a top surface 201 of the lead screw, or a portion thereof, is disposed beneath the bushing sleeve 125. That is, the first and second lead screws 200 are threaded within aperture 210 and rotated (primed) such that a top surface 201 of the lead screw is proximate to and below a bottom surface 122 of a seat plate 120, or in the illustrated embodiment, lower edge 126 of bushing 125. In some applications, lead screws 200 disposed in the first position 215 may be in slight contact (i.e., just at the point of contact) with an inferior surface 122 (lower edge 126 of the bushing) of a seat plate assembly 120.

Figure 7:
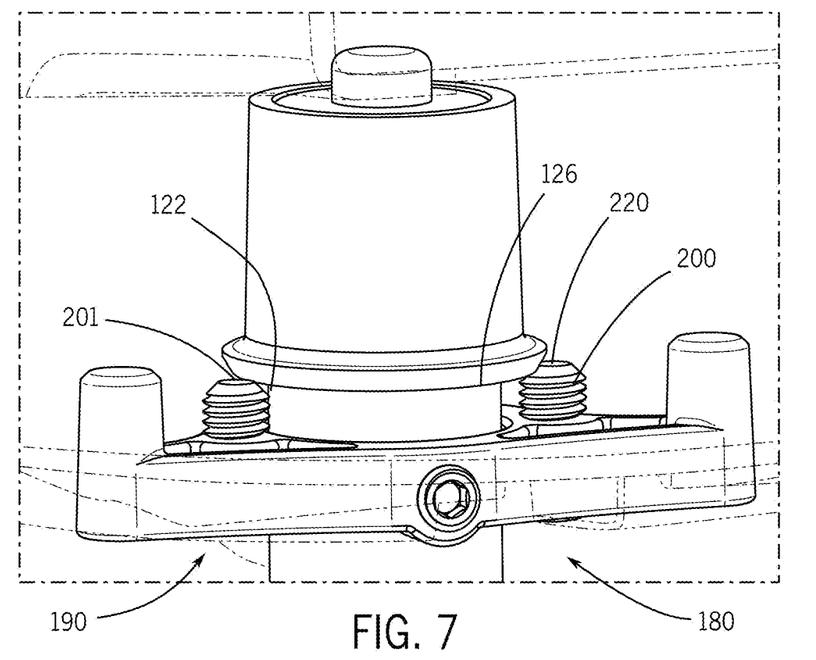
FIG. 7 is an isolated perspective view of a gas lift cylinder removal device of FIG. 5 shown after operation of the device.
Figure 8:
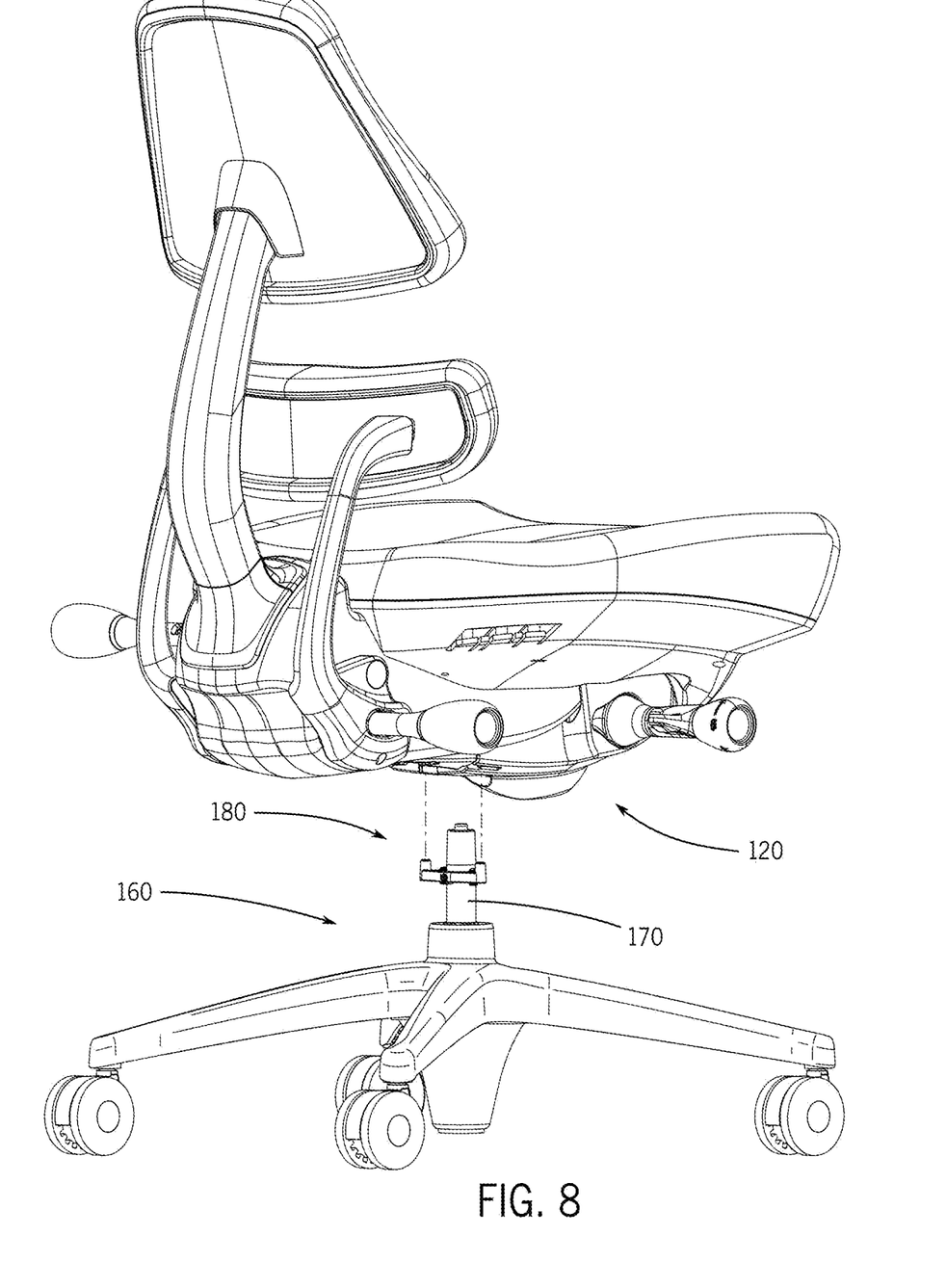
FIG. 8 depicts a perspective view showing the disassembling of the base assembly from the seat plate assembly of the task chair of FIG. 1.

Referring now to FIG. 7, each lead screw is rotated (i.e., screwed in, or threaded), for example using a hex key, in small increments and following an alternating fashion until each lead screw reaches a second position 220. An alternating sequence is followed to provide balance to the actuation of the removal device 180. In other words, the first lead screw is rotated in a small increment followed by the rotation of the second lead screw such that each of the first and second lead screws are threaded in substantially equal increments during operation of the device 180. The gas lift cylinder removal tool 180 provides a mechanical advantage by converting a minimal input force on a lead screw 200 in the form of a small, incremental rotation and outputting a greater, leveraging force in the form of a vertical translation/displacement of the lead screw.

Set screw 195 is provided to lock the collar assembly 190 of removal tool 180 to the gas lift cylinder 170, thus providing a bearing surface from which lead screws 200 can displace the cylinder from the seat plate assembly 120. Particularly, rotation of the lead screws 200 from position 215 to position 220 urges a top surface 201 of the lead screws to contact an inferior surface 122 (or a lower edge 126 of the bushing in the present embodiment) of the seat plate assembly 120. Operation of the gas lift cylinder removal device provides a steady upward force on the lower edge of the bushing, eventually causing the cylinder to disassemble from the seat plate assembly (i.e., the press-fit coupling the upper and lower assemblies is broken or separated). By rotating lead screws 200 in small, alternating increments, a user may effectively balance, and thus control, the leveraging force imparted by the gas lift cylinder removal device 180. In this way, removal tool 180 provides a safe, and non-destructive mechanical advantage to leverage apart (mechanically displace) the press-fit coupling the bushing of the seat plate assembly to the gas lift cylinder. In one implementation, lead screws 200 make forcible contact with an edge 126 of bushing 125 of the seat plate assembly 120 in order to uncouple the gas lift cylinder 170; however, lead screws 200 may make forcible contact with any inferior (lower) surface 122 or structure disposed beneath the seating surface. As mentioned above, the pneumatic cylinder may attach to any suitable structure beneath the seating surface, such as for example, a conventional seat plate mechanism, a mechanical housing, or a seat swivel base mount plate.

Following operation of the gas lift cylinder removal device 180 the upper assembly, including the seat plate assembly 120 and the seat support 110 is removed from the lower assembly 160. As shown in the illustration depicted in FIG. 8, the cylinder removal device 180 remains coupled to the gas lift cylinder 170 provided with the base assembly. In some applications, a second cylinder removal device may be employed to separate the pneumatic piston from the base assembly. However, it may not be feasible for a user to separate the gas lift cylinder from both the seat plate assembly and the base assembly. For example, separating the cylinder from the base assembly may make reassembly of the example task chair more difficult for a user, particularly properly aligning and recoupling the gas lift cylinder to both the base assembly and the seat plate assembly. When replacing a faulty gas lift cylinder, it may be more efficient, for example, to replace the base assembly as a whole. In such an application, the base assembly including a gas lift cylinder and the gas lift cylinder removal device can be pre-assembled as a part of the manufacturing process prior to installation by a user. When pre-assembled, lead screws 200 of the cylinder removal tool 180 can be pre-threaded to the correct first position 215.

Figure 9:
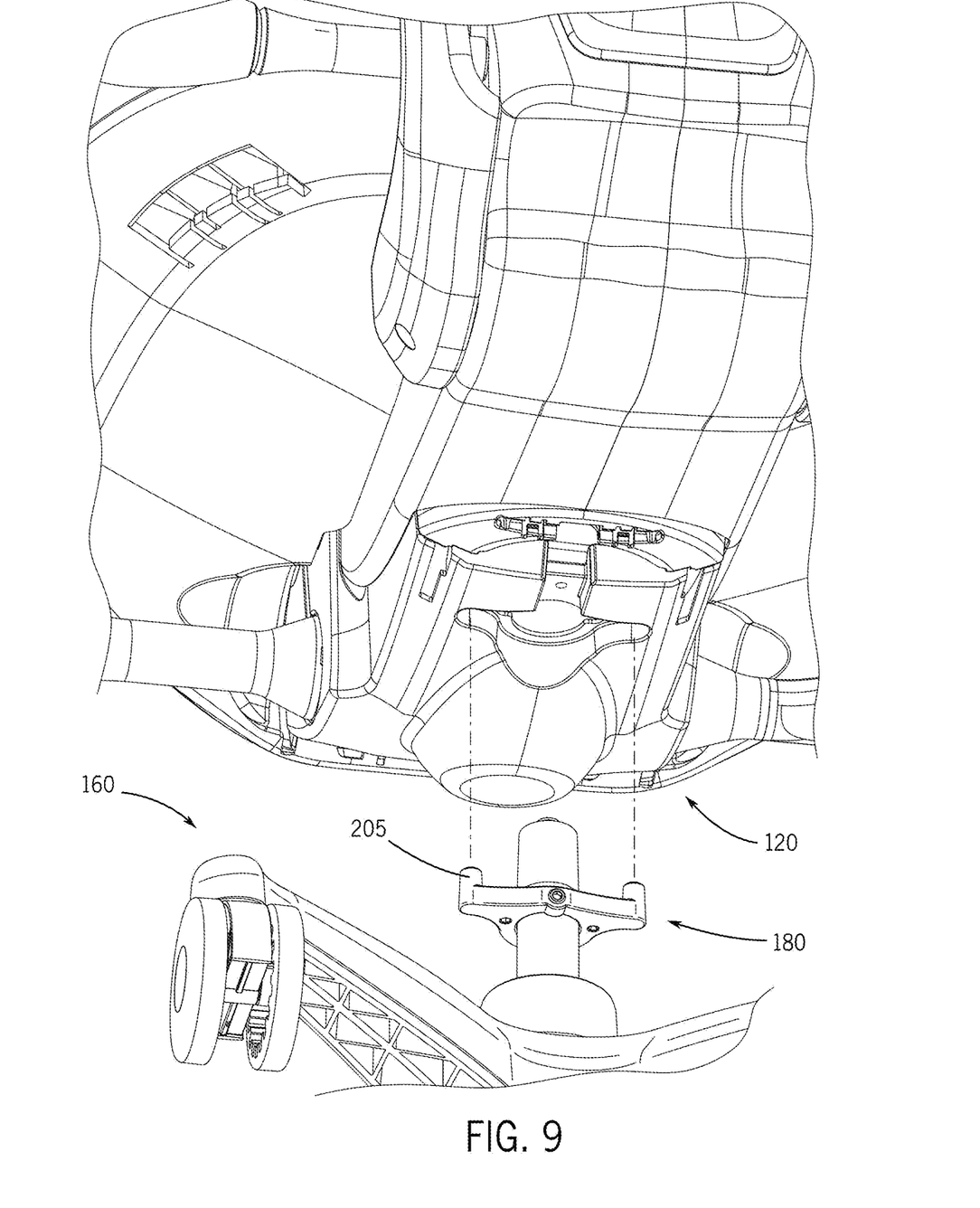
FIG. 9 depicts elevation view illustrating the alignment of the seat assembly onto the base assembly of the task chair of FIG. 1.
Figure 9A:
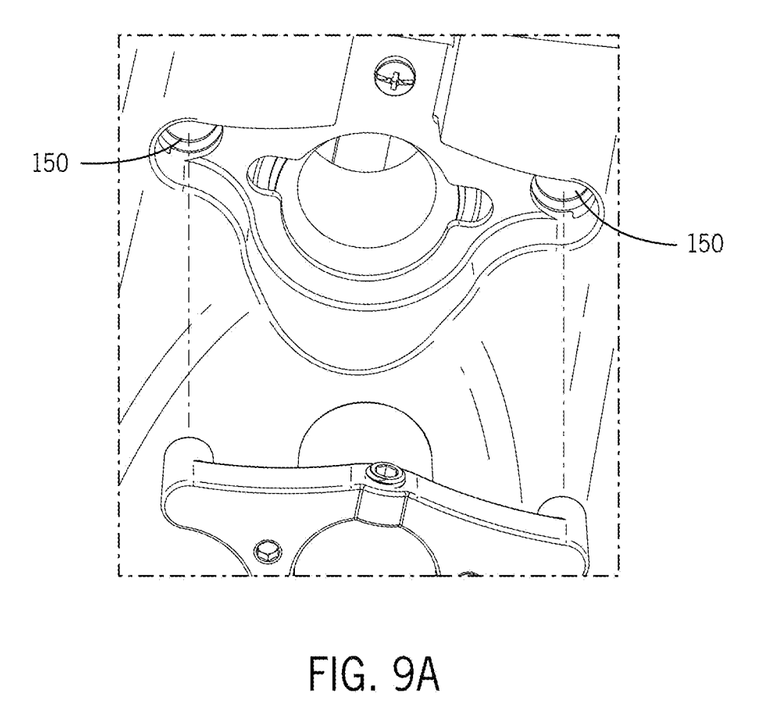

In the example construction shown in FIG. 9, assembly of the example task chair 100 is completed using minimal effort. First and second guide pins 205 extending from a top surface 191 of the collar assembly of the gas lift cylinder removal device 180 align into apertures 150 on either side of the bushing on a bottom surface of the seat plate assembly 120, as shown in FIG. 9A. The upper assembly is lowered onto the base assembly and the press-fit between the cylinder of the base assembly and the bushing of the seat plate assembly is achieved by applying a firm downward force on the seat surface 110 of the example task chair 100.

Figure 10:
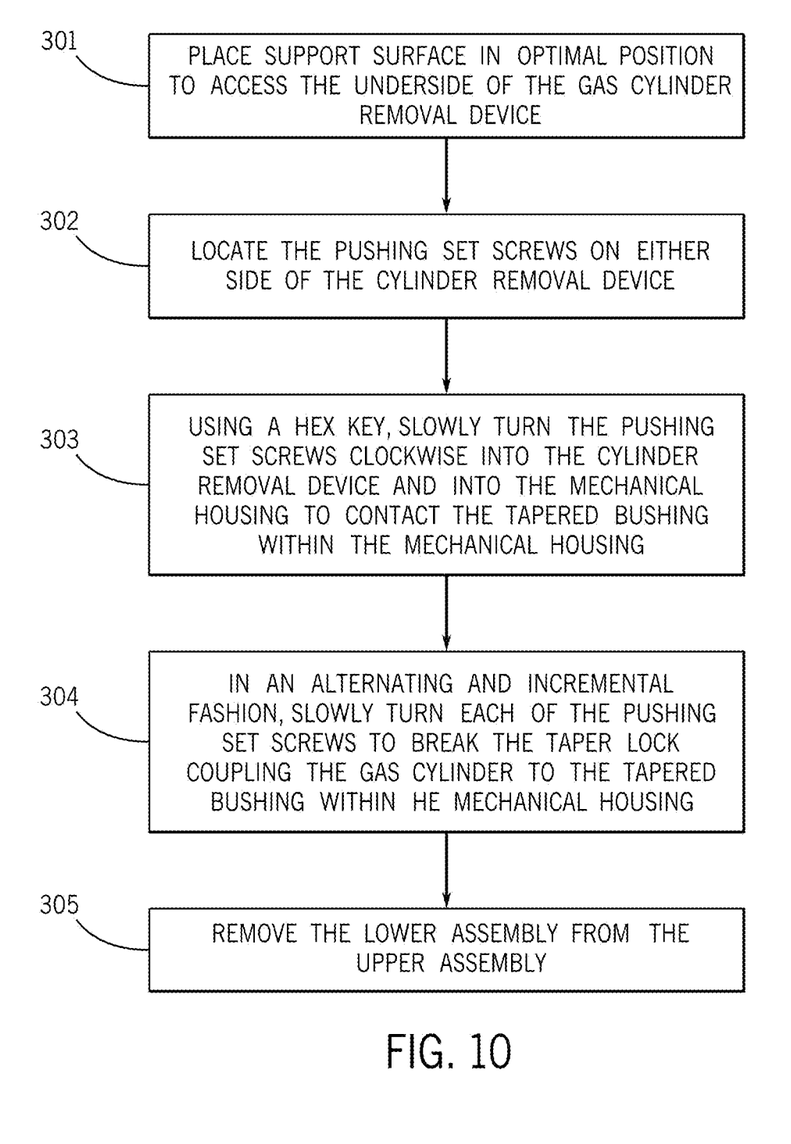
FIG. 10 depicts a flow chart describing a method of removing a gas lift cylinder using the gas lift cylinder removal device shown in FIG. 2.
Figure 11:
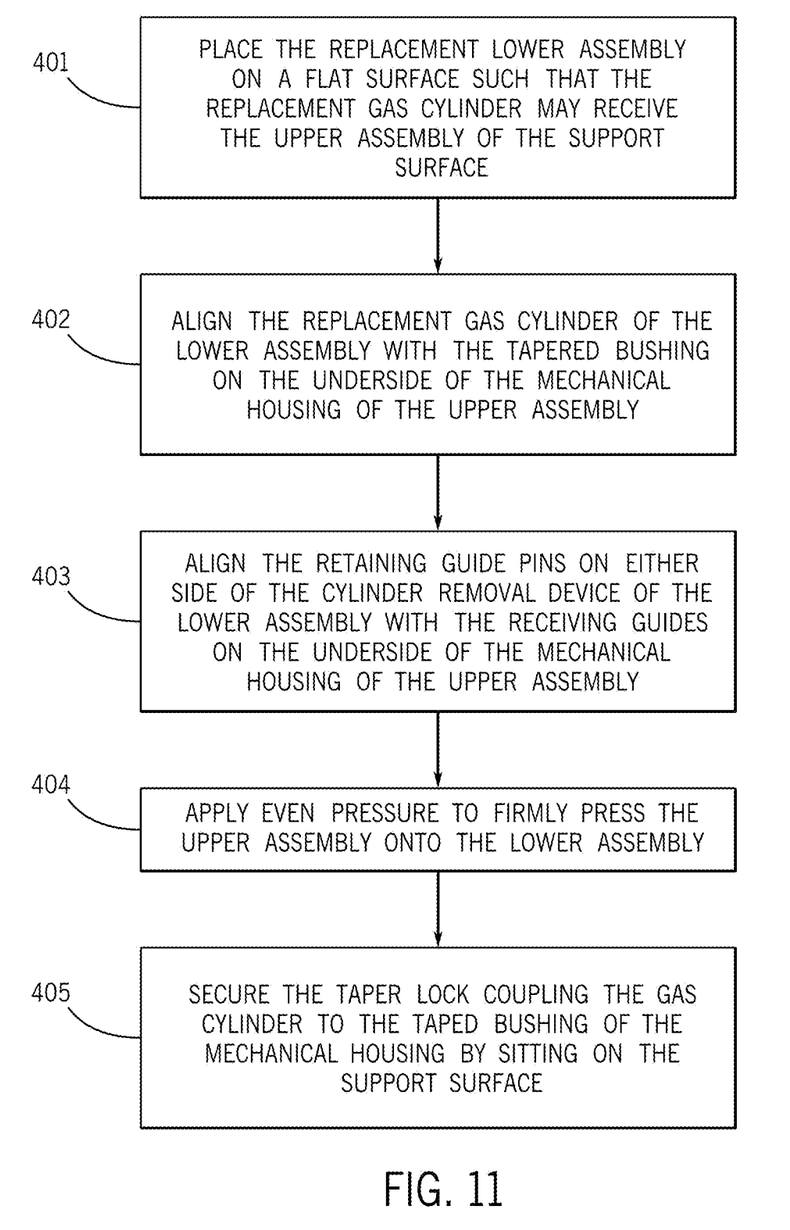
FIG. 11 depicts a flow chart describing a method of replacing a gas lift cylinder for use with the task chair of FIG. 1.

Turning now to FIGS. 10 and 11, flow charts describing a method of removal and a method of installation are depicted. Referring to FIG. 10, a method for removing a faulty gas lift cylinder 170 using an example gas lift cylinder removal device 180 is described herein. The example method described herein is for use with the task chair 100 illustrated in FIG. 1. The gas lift cylinder removal tool is used to remove a failed pneumatic piston in step 301 by first placing the task chair 100 in an optimal position to access the underside of the seat plate assembly 120, more specifically, to access the underside of the collar assembly 190 of the cylinder removal device. In steps 302 and 303, a user locates each of the lead screws 200 and primes (i.e., threads) each screw such that the lead screws are disposed in a first position 215 proximate to the lower edge 126 of the bushing 125. Moving to step 304, a user slowly rotates each of the lead screws 200 in an alternating fashion using a hex key to a second position 220 such that surface 201 of the lead screws makes forcible contact with edge 126. Step 304 is complete when the taper lock is broken between the gas lift cylinder 170 and the seat plate assembly 120. In step 305, the upper assembly including the seat plate assembly and the seat support surface is removed from the base assembly.

Reassembly of the example task chair described herein is completed using minimal effort by first placing the base assembly 160 (or replacement base assembly) on a flat and stable surface in step 401. The base assembly can include a cylinder removal tool 180 disposed on the gas lift cylinder 170, thereby preventing the need to reset lead screws 200 into the first position 215; however, in some applications, lead screws 200 may need to be reset from the second position 220 back to the first position 215 as a part of step 401. In steps 402 and 403 a user aligns first and second guide pins 205 extending from a top surface 191 of the collar assembly of the gas lift cylinder removal device 180 into apertures 150 on either side of the bushing on a bottom surface 122 of the seat plate assembly. The replacement gas lift cylinder 170 of the base assembly 160 is aligned within the bushing 125 and the upper assembly is lowered onto the base assembly. In steps 404 and 405 even pressure is applied downward onto the seat surface such that a press-fit between the cylinder of the base assembly and the bushing of the seat plate assembly is achieved. Assembly of the example task chair is complete in step 405 by sitting on the support surface 110, the user securing the press-fit of step 404 by applying a firm downward force on the seat surface of the example task chair 100.

Although the invention may be particularly well suited for an aftermarket application, it should be understood that the invention may be provided with pneumatic-adjustable furniture of original manufacture. The gas cylinder removal device described herein may be manufactured and sold separately as an aftermarket product for application to task chairs, or may be applied to chairs of original manufacture. In addition, it should be appreciated that the gas lift cylinder removal device may be integral to the task chair, or their components, such as for example the cylinder, the seat plate assembly, the housing or support structure, or the base assembly.

One or more of the disclosed embodiments, alone or in combination, may provide one or more technical effects including providing a mechanical advantage using a simple machine to safely and easily remove a gas lift cylinder from a seating device. The technical effects and technical problems in the specification are exemplary and are not limiting. It should be noted that the embodiments described in the specification may have other technical effects and can solve other technical problems.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom," "left" and "right," "front" and "back") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

The terms "fixedly," "non-fixedly," and "removably," and variations thereof, may be used herein. The term "fix," and variations thereof, refer to making firm, stable, or stationary. It should be understood, though, that fixed doesn't necessarily mean permanent—rather, only that a significant or abnormal amount of work needs to be used to make unfixed. The term "removably," and variations thereof, refer to readily changing the location, position, or station. Removably is meant to be the antonym of fixedly herein. Alternatively, the term "non-fixedly" can be used to be the antonym of fixedly.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (e.g., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC, or ABC).

It is also important to note that the construction and arrangement of the system, methods, and devices as shown in the various examples of embodiments is illustrative only, and not limiting. Although only a few embodiments have been described in detail in this disclosure, those skilled in the art who review this disclosure will readily appreciate that many various alternatives, modifications, variations, improvements and/or substantial equivalents, whether known or that are or may be presently foreseen, are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes, and omissions may be made in the design, operating conditions, and arrangement of the various examples of embodiments without departing from the spirit or scope of the present inventions. Therefore, the invention is intended to embrace all known or earlier developed alternatives, modifications, variations, improvements and/or substantial equivalents.

The invention claimed is:

1. An apparatus configured to decouple from a surface, the apparatus comprising:
   a support surface;
   a collar assembly disposed beneath the support surface, the collar assembly including a pin extending therefrom and the pin extends through an aperture of the support surface;
   a screw provided to move from a first position to a second position, a movement of the screw from the first position to the second position imparting mechanical displacement of the collar assembly from the support surface; and
   wherein the pin prevents rotation of the apparatus relative to the support surface when moving the screw from the first position to the second position.

2. The apparatus of claim 1, wherein the apparatus is provided on a gas lift cylinder.

3. The apparatus of claim 2, further comprising a set screw coupling the collar assembly to the gas lift cylinder.

4. The apparatus of claim 1, wherein the screw is disposed in a threaded aperture, the threaded aperture extending through a portion of the collar assembly.

5. The apparatus of claim 1, wherein a top surface of the screw makes contact with the support surface when moving from the first position to the second position.

6. The apparatus of claim 1, wherein the screw is a first screw, and the apparatus further comprises a second screw.

7. The apparatus of claim 6, wherein a top surface of the first screw and a top surface of the second screw each, respectively, make contact with the support surface when moving from the first position to the second position.

8. The apparatus of claim 1, wherein the pin is a first pin, and the collar assembly further includes a second pin extending therefrom.

9. The apparatus of claim 8, wherein the first and second pins, respectively, are configured to prevent rotation of the apparatus relative to the support surface when moving the screw from the first position to the second position.

10. A chair having the apparatus of claim 1.

11. A chair comprising:
    a seat plate;
    a gas lift cylinder coupled to the seat plate; and
    an apparatus disposed on the gas lift cylinder and beneath the seat plate, the apparatus comprising:
      a collar assembly including a pin extending therefrom, the pin extending through an aperture of the seat plate; and
      a screw provided to move from a first position to a second position,
    wherein movement of the screw from the first position to the second position imparts mechanical displacement of the gas lift cylinder from the seat plate, and wherein the pin prevents rotation of the apparatus relative to the seat plate when moving the screw from the first position to the second position.

12. The chair of claim 11, wherein the apparatus further comprises a set screw coupling the collar assembly to the gas lift cylinder.

13. The chair of claim 11, wherein the screw is disposed in a threaded aperture, the threaded aperture extending through a portion of the collar assembly.

14. The chair of claim 13, wherein the screw is a first screw, and the apparatus further comprises a second screw, and wherein the second screw is disposed in a threaded aperture, the threaded aperture extending through a portion of the collar assembly.

15. The chair of claim 14, wherein a top surface of the first screw and a top surface of the second screw each, respectively, make contact with the seat plate when moving from the first position to the second position.

* * * * *